UNITED STATES PATENT OFFICE.

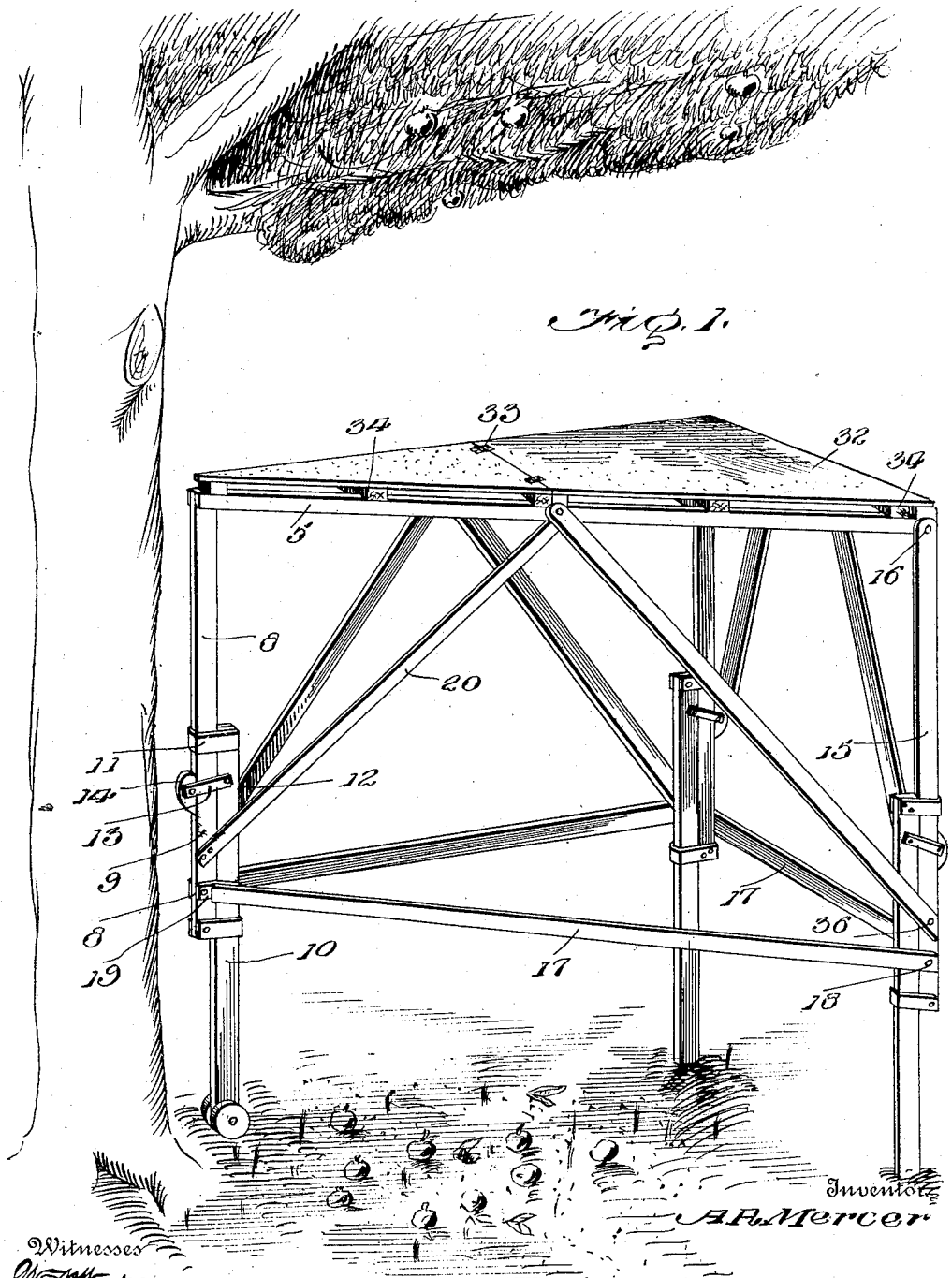

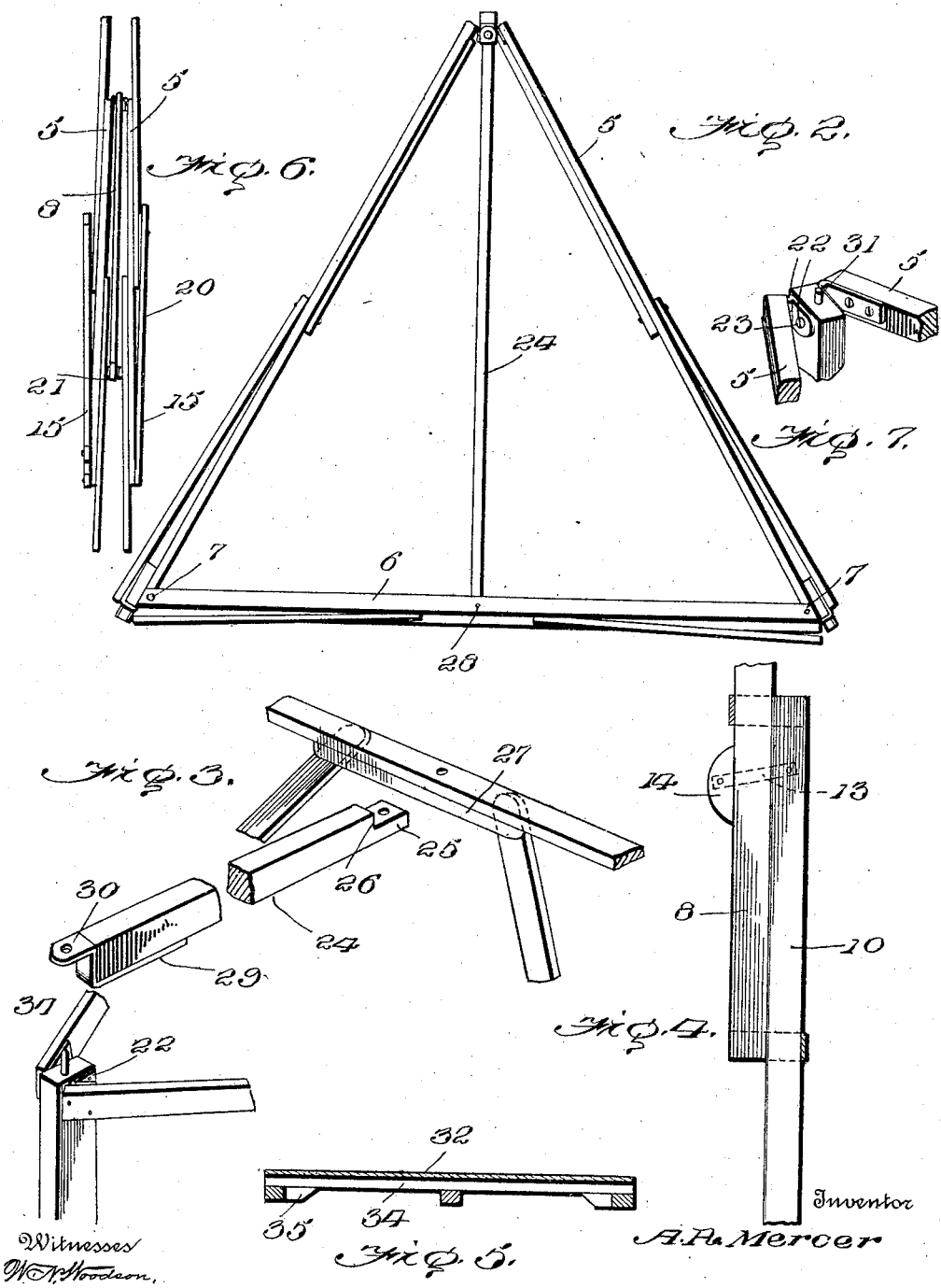

ANGUS R. MERCER, OF TRAVERSE CITY, MICHIGAN.

FRUIT-PICKER'S PLATFORM.

967,803.  Specification of Letters Patent.  Patented Aug. 16, 1910.

Application filed September 28, 1909. Serial No. 519,908.

*To all whom it may concern:*

Be it known that I, ANGUS R. MERCER, citizen of the United States, residing at Traverse City, in the county of Grand Traverse and State of Michigan, have invented certain new and useful Improvements in Fruit-Pickers' Platforms, of which the following is a specification.

This invention relates to fruit pickers' platforms and has for its object to provide a strong, durable and thoroughly efficient device of this character, upon which the picker may stand when gathering fruit from a tree.

A further object is to provide a fruit picker's platform, the construction of which is such that the same may be positioned close to a tree and the supporting legs thereof adjusted to accommodate any unevenness or irregularities in the surface of the ground.

A further object is to provide a folding platform or stand capable of being readily set up for use and quickly knocked down and compactly folded for storage or shipment.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a fruit picker's platform constructed in accordance with my invention; Fig. 2 is a top plan view of the same with the floor or platform removed; Fig. 3 is a detail perspective view of a portion of the device showing the manner of connecting the side bars and intermediate bar with the front leg of the stand; Fig. 4 is a side elevation partly in section of one of the supporting legs; Fig. 5 is a transverse sectional view of one of the pivoted sections of the floor or platform; Fig. 6 is a top plan view showing the manner of folding the device; Fig. 7 is a detail perspective view.

Corresponding and like parts are referred to in the following description and indicated in all the views of the drawings by the same reference characters.

The improved platform forming the subject matter of the present invention comprises a substantially triangular supporting frame including converging side bars or beams 5 connected at their diverging ends by a transverse bar 6, the latter being detachably secured to the side bars by bolts or similar fastening devices 7.

Interposed between the converging ends of the side bars or beams 5, is a depending supporting leg 8, preferably formed in two sections 9 and 10 so as to permit the platform to be raised or lowered and also to accommodate the device to any unevenness or irregularities in the surface of the ground. The sections 9 and 10 are connected by strap irons or guides 11 so as to hold the same in assembled position, while at the same time permitting said sections to be adjusted relatively to each other for the purpose before stated. Pivotally mounted at 12 on the relatively movable section 10 of the front supporting leg, are spaced bars 13, between the free ends of which is pivotally mounted a clamping block 14, so that after the section 10 has been adjusted and the block 14 swung downwardly, the latter will clamp the sections 9 and 10 in frictional engagement with each other and thus lock said sections in adjusted position.

Depending from the diverging ends of the side bars 5 are rear legs 15, similar in construction to the forward leg 8, the upper or relatively stationary section of each rear leg section being pivotally connected with the adjacent side bar 5 of the frame by a bolt or similar fastening device 16 so as to permit the rear legs to be swung upwardly in parallel relation to the side bars 5 when it is desired to collapse the device for transportation or shipment.

The supporting legs of the stand are reinforced and strengthened by the provision of horizontal braces 17, which latter are detachably secured to the stationary sections of the adjacent legs by bolts 18. Two of the horizontal braces 17 are preferably provided with terminal strap irons or bars 19 which bear against the opposite faces of the relatively stationary section 9 of the forward supporting leg in order to reinforce and strengthen the latter, one of the fastening devices 18 being passed through the strap irons 19, as best shown in Fig. 1 of the drawings. Diagonal braces 20 are also preferably extended from the intermediate portions of the side bars 5 and transverse bar 6 to the stationary sections of the adjacent supporting legs in order to strengthen the stand and prevent the same from wabbling when in use.

Journaled on the movable section 10 of the forward supporting leg, are oppositely disposed rollers 21 so that by grasping the rear horizontal brace 17, the operator may tilt the stand and thus roll the latter over the surface of the ground from one tree to the other.

Secured to the inner faces of the side bars 5 at the apex of the frame, are hinges 22, one leaf of each of which is rigidly secured to the adjacent side bar 5, while the other leaf thereof is pivotally connected at 23 with the stationary section 8 of the forward supporting leg so as to permit the forward supporting leg to be swung upwardly between the side bars 5 on the pivot 12 and said side bars swung together or in contact with the forward supporting leg when folding the device.

Extending longitudinally of the supporting frame at the top thereof, is an intermediate brace bar 24, one end of which is cut-away at 25 to form a shoulder 26, which latter bears against a horizontal cleat 27 secured to the horizontal bar 6, there being alined openings formed in the bar 6, cleat 27, and cut-away portion 25 of the intermediate bar 24 to permit the passage of a bolt 28. Secured to the other end of the intermediate bar 24, is a strap iron or bracket 29, the metal forming the free end of the bracket being bent upwardly in contact with the adjacent end of the brace 24 and thence extended laterally to produce a perforated lip 30. A pin 31 extends upwardly from the forward supporting leg and passes through the perforation in the lip 30 so as to retain the intermediate brace 24 in position on the stand.

Mounted on the stand is a removable floor or platform 32, the latter being preferably formed in two sections pivotally connected at 33 so as to permit the floor to be folded when not in use. The floor or platform 32 may be formed of spaced slats or solid, if desired, the upper face of the platform being preferably smooth and unobstructed, while the lower face thereof is provided with a series of transverse reinforcing cleats 34 which rest on the upper longitudinal edges of the side bars 5. Suitable blocks 35 are fastened on some of the transverse cleats 34 and bear against the inner faces of the adjacent side bars 5 so as to prevent lateral displacement of the platform when in position on the stand.

It will here be noted that the rear transverse bar or cleat 34, by engagement with the transverse bar 6 of the supporting frame, serves to prevent longitudinal movement of the floor or platform 32, while the stop blocks 35, by engagement with the side bars 5, serve to prevent lateral displacement of said platform. It will also be noted that by reason of the peculiar shape of the platform and supporting frame, the latter may be positioned close to a tree during the picking operation and thus dispense with the common step or rung ladder usually employed for this purpose.

When it is desired to collapse the stand for transportation or shipment, the floor or platform 32 is removed from the stand and the front section thereof folded laterally and downwardly upon the rear section of the platform. The fastening devices 18 and 36 are then removed and the horizontal bars 17 detached from the supporting legs, after which the fastening devices 7 and 28 are removed and the horizontal bar 6 and intermediate brace or bar 24 detached and tied together in a bundle with the horizontal braces 17. The forward supporting leg 8 is then swung upwardly between the side bars 5 and the rear supporting legs 15 swung laterally and upwardly against the outer faces of said side bars and the latter together with the rear supporting legs 15 swung inwardly on the hinges 22 against the forward leg 8, the diagonal braces 20 being subsequently folded against the side bars 5, as best shown in Fig. 6 of the drawings.

The device is comparatively light in weight and strong and durable in construction and may be manufactured and placed on the market at a very small initial cost.

Having thus described the invention, what is claimed as new is:

1. A device of the class described comprising a substantially triangular supporting frame, legs depending from the frame at the corners thereof and each formed of relatively stationary and movable sections, a longitudinal brace extending from the forward supporting leg to a point on said supporting frame intermediate the rear supporting legs, a sectional platform resting on the frame above said brace, means for locking the movable sections of the legs in adjusted position, and a roller mounted on the movable section of the forward supporting leg.

2. A device of the class described comprising a stand formed of converging side bars connected by a transverse bar, a forward supporting leg pivotally connected with the converging side bars, rear supporting legs also pivotally connected with the side bars, a hinged connection between the converging ends of the side bars and the forward supporting leg, and a sectional platform resting on the side bars and bearing against the transverse bar.

3. A device of the class described comprising a stand including converging side bars connected by a detachable transverse bar, a forward supporting leg interposed between the converging ends of the side bars, a hinged connection between the side bars and said forward supporting leg, a pin extending vertically from the forward supporting leg, an intermediate longitudinal brace having a perforated lip secured to one end thereof and adapted to receive the pin and its other end provided with a shoulder adapted to bear against the transverse bar, and a platform resting on the side bars and provided with a transverse cleat adapted to bear against the transverse bar of the frame.

4. A device of the class described including a frame formed of converging side bars connected by a transverse bar, supporting legs depending from the corners of the frame and each formed of relatively stationary and movable sections, strap irons embracing both sections of each supporting leg, spaced bars pivotally connected with the opposite sides of the movable section of each supporting leg, clamping blocks pivotally mounted between the strap irons and adapted to engage the stationary section of each leg for retaining the movable section in adjusted position, a roller journaled on the forward supporting leg only, and a detachable platform mounted on the frame and provided with a transverse cleat adapted to bear against the transverse bar of said frame.

5. A device of the class described including a substantially triangular frame, comprising converging side bars connected by a detachable transverse bar, vertically adjustable legs depending from the frame at each corner thereof, hinges each having one leaf thereof pivotally connected with the forward supporting leg and its other leaf rigidly secured to the adjacent side bar of the stand, horizontal braces connecting the lower portions of the legs, inclined braces forming a connection between the legs and the converging side bars of the frame, a sectional platform supported on the stand, and transverse cleats secured to the bottom of the platfrom and provided with stop blocks adapted to bear against the inner face of the converging bars of said frame.

6. A device of the class described comprising a stand formed of converging side bars connected by a detachable transverse bar, supporting legs depending from the corners of the stand and each formed of relatively stationary and movable sections, the forward supporting leg being pivotally connected with the converging ends of the side bars and the rear supporting legs pivotally connected with the diverging ends of said side bars, horizontal braces connecting the stationary section of the supporting legs, inclined braces forming a connection between the converging side bars of the stand and the stationary sections of said supporting legs, means for securing the movable sections of the supporting legs in adjusted position, a roller journaled on the movable section of one of the supporting legs, and a platform resting on the converging side bars of the stand and provided with a transverse cleat adapted to bear against the transverse bar of said stand.

In testimony whereof I affix my signature in presence of two witnesses.

ANGUS R. MERCER. [L. S.]

Witnesses:
PETER J. DANHOF,
CHAS. H. WINCHESTER.